United States Patent
Anderson (12) 
(10) Patent No.: US 6,573,990 B1
(45) Date of Patent: Jun. 3, 2003

(54) OPTICAL SYSTEM PROVIDING CONCURRENT DETECTION OF A CALIBRATION SIGNAL AND A TEST SIGNAL IN AN OPTICAL SPECTRUM ANALYZER

(75) Inventor: Duwayne R. Anderson, St. Helens, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/564,298

(22) Filed: May 3, 2000

Related U.S. Application Data
(60) Provisional application No. 60/184,163, filed on Feb. 21, 2000.

(51) Int. Cl.[7] .................................................. G01J 3/28
(52) U.S. Cl. ...................................... 356/330; 356/328
(58) Field of Search ................................... 356/326, 328, 356/305, 330; 385/37

(56) References Cited

U.S. PATENT DOCUMENTS

| | | | | |
|---|---|---|---|---|
| 3,554,649 A | * | 1/1971 | Ridgway | 356/100 |
| 3,567,322 A | | 3/1971 | Brehm et al. | |
| 4,387,955 A | * | 6/1983 | Ludman et al. | 350/96.19 |
| 4,743,112 A | * | 5/1988 | Burke | 356/326 |
| 5,042,893 A | * | 8/1991 | Ong | 385/49 |
| 5,475,489 A | | 12/1995 | Gottsche | |
| 5,488,474 A | * | 1/1996 | Fateley et al. | 356/326 |
| 5,748,365 A | * | 5/1998 | Chen | 359/366 |
| 6,181,418 B1 | * | 1/2001 | Palumbo et al. | 356/328 |
| 6,208,413 B1 | * | 3/2001 | Diehl et al. | 356/330 |
| 6,266,140 B1 | * | 7/2001 | Xiang et al. | 356/328 |

FOREIGN PATENT DOCUMENTS

| | | |
|---|---|---|
| DE | 19847977 A | 6/1999 |
| WO | WO 01/57483 A | 8/2001 |

* cited by examiner

*Primary Examiner*—Michael P. Staffra
*Assistant Examiner*—Layla G. Lauchman
(74) *Attorney, Agent, or Firm*—William K. Bucher (57) ABSTRACT

An optical system having a first order spectral range that is usable in an optical spectrum analyzer receives an broadband optical test signal and a optical calibration signal and couples the optical signals via two optically isolated paths to separate optical detectors. First and second pairs of optical fibers, with each pair having an input fiber and an output fiber, are positioned in a focal plane of a collimating optic that has an optical axis. The fiber pairs are symmetrically positioned on either side of the optical axis with the input fibers positioned on one side of the optical axis and the output fibers positioned on the opposite side of the optical axis. The input fibers receive the optical test signal and the optical calibration signal. The output optical fibers are coupled to first and second optical detectors. An optical calibration source generates second order or greater spectral lines that fall within the first order spectral range of the optical system. A diffraction grating receives the optical test signal and the optical calibration signal from the collimating optic and separates the first order spectral components of the broadband optical test signal and passes the second order or greater spectral lines of the optical calibration signal. The first optical detector that is responsive to the first order spectral components of the optical test signal receives the optical test signal from the collimating optic and converts the optical test signal to an electrical signal. A second optical detector that is responsive to the second order or greater spectral lines of the optical calibration signal concurrently receives the optical calibration signal from the collimating optic and converts the calibrations signal to an electrical signal.

35 Claims, 3 Drawing Sheets

OPTICAL SYSTEM PROVIDING CONCURRENT DETECTION OF A CALIBRATION SIGNAL AND A TEST SIGNAL IN AN OPTICAL SPECTRUM ANALYZER

CROSS-REFERENCE TO RELATED APPLICATION

This application claims the benefit of the U.S. Provisional Application No. 60/184,163, filed Feb. 21, 2000.

BACKGROUND OF THE INVENTION

The present invention relates generally to optical systems more particularly to an optical system providing concurrent calibration signal and test signal detection in an optical spectrum analyzer that is useful in analyzing optical telecommunications transmission lines.

The telecommunications industry is increasingly deploying dense-wavelength-multiplexed (DWDM) optical system in their optical networks. A typical DWDM optical system launches multiple optical signals at various wavelengths into a single mode optical fiber. The optical signals include a 1480 nm optical signal from a pump laser. The pump laser signal is used for fiber amplifiers in the system. The pump laser signal may also have a wavelength of 980 nm. A 1625 nm service channel optical signal is provided for communications between central offices and the like. Multiple, closely spaced optical signal channels, in the range of 1525 nm to 1585 nm, are used for telecommunication traffic through the fiber. The standard separations between adjacent optical signal channels for current DWDM transmission systems are 200 GHz., 100 GHz., and 50 GHz. which approximately equals 1.6 nm, 0.8 nm, and 0.4 nm separation between channels at 1550 nm. Future DWDM telecommunications systems are designed with 25 GHz. separation which approximately equals 0.2 nm separation between optical signal channels. To qualify and characterize these optical signal channels requires the use of an optical spectrum analyzer.

Optical spectrum analyzers (OSA) are instruments that measure the optical power as a function of wavelength or frequency. Advantages of optical spectrum analyzers are their dynamic range and performing measurements involving many discrete spectral lines. A significant drawback to existing optical spectrum analyzers is the relative unreliability of their wavelength measurements, with errors in the range of 40 to 50 picometers. Because of this drawback, wavelength meters have been developed to make precise wavelength measurements and to calibrate optical spectrum analyzers. Wavelength meters are based on the Michelson interferometer. Thousands of digitized interference fringes are converted from the spectral domain to the frequency domain. The frequency and modulation of the fringes are converted through the Fourier transform into information about the wavelength and power. While wavelength meters have much better wavelength calibration accuracy, they typically have much worse dynamic range than a grating-based OSA.

Generally, the measured optical signal and the calibration optical signal both follow the same optical path through the optical spectrum analyzer and occupy the same general region of the optical spectrum. A typical calibration of an OSA uses the following procedure. First, an optical signal with a known spectra is applied to the OSA from a calibration source. The calibration source may be external to the OSA or it may be an internal source that is injected into the OSA's optical path through an internal optical switch. The optical spectra is scanned with the OSA and the wavelengths at which the spikes occur in the known spectra are measured and recorded. The wavelength errors at the measured spikes are determined and the wavelength-measurement errors are estimated as a function of the wavelength by interpolating between and beyond the known spectral lines. The wavelength-measurement errors are subtracted from the corresponding measured wavelength spikes to calibrate the OSA.

Because the calibration optical signal and the measured optical signal both follow the same optical path through the OSA, the OSA cannot measure the calibration spectra at the same time it is being used to measure an unknown optical signal. Therefore, the calibration procedure is a serial process of calibrating the OSA and them measuring the test signal. The OSA is presumed to remain calibrated for a certain amount of time, whereupon it must be calibrated again before proceeding with further measurements.

One drawback to the current calibration procedure is the uncertainty in knowing when the OSA is out of calibration. This means that recalibration typically occurs either before it is necessary, or after it is necessary. In the first case, an operator wastes time with an unnecessary calibration and in the second case the measurement results of the OSA have excessive error because the calibration was not performed.

What is needed is a optical system providing concurrent optical detection of an optical test signal and an optical calibration signal in an optical spectrum analyzer. The optical system should provide very accurate wavelength calibration in the optical spectrum analyzer. Additionally, the optical spectrum analyzer should be capable of concurrently detecting both the calibration signal and the optical signal under test using two optical paths with the same wavelength calibration characteristics. Further, the optical spectrum analyzer should provide optical isolation between the calibration signal and the optical test signal.

SUMMARY OF THE INVENTION

Accordingly, the present invention is to an optical system having a defined first order spectral range that concurrently detects an optical calibration signal and an optical signal under test. The optical system has collimating optics, such as a parabolic or spherical mirror or the like, having an optical axis and a focal plane that receives the optical calibration signal and the optical signal under test. A fiber array is disposed in the focal plane of the collimating optics and has a center axis that is colinear with the optical axis of the collimating optics. First and second pairs of optical fibers are disposed in the focal plane of the collimating optics with each pair of fibers having an input optical fiber and an output optical fiber. The input and output optical fibers of each pair are symmetrically positioned on either side of the center axis with the input fiber of the first pair of optical fibers coupled to receive the optical signal under test. An optical source is coupled to the input fiber of the second pair of optical fibers and generates an optical calibration signal having second order or greater spectral lines that fall within the first order spectral range of the optical system. An optical tuning element receives the optical calibration signal and the optical signal under test from the collimating optics and tunes the optical system over the first order spectral range to separate spectral components of the optical calibration signal and the optical signal under test. A first optical detector is coupled to the output optical fiber of the first pair of optical fibers and is responsive to the spectral components of the optical signal under test and less responsive to the second order or greater spectral lines of the optical calibration signal. A second optical detector is coupled to the output optical fiber of the second pair of optical fibers and is responsive to the second order or greater spectral lines of the optical calibration signal and less responsive to the spectral components of the optical signal under test.

In the preferred embodiment of the invention, the fiber array is a V-groove block having approximately V-shaped channels formed therein that are parallel to and equidistant on either side of the central axis of the V-block. The optical source is a optical signal generating device producing a spectral output in response to shifts in emission or absorption energy levels in atomic or molecular species. In the preferred embodiment, the optical source is a mercury-argon discharge lamp. The optical tuning element is preferably a diffraction grating. The first optical detector is a InGaAs PIN or avalanche photodiode that is responsive to the first order spectral components of the optical test signal. The second optical detector is a silicon photodiode that is responsive to the second order or greater spectral lines of the optical calibration signal.

The various embodiments of the optical system may be incorporated into an optical spectrum analyzer concurrently detecting an optical signal under test and an optical calibration signal. Such a combination provides continuous calibration of the optical spectrum analyzer. The optical spectrum analyzer includes the optical system where the optical test signal detector and the optical calibration signal detector are included in respective optical receivers. The optical receivers convert the respective optical signal into electrical signal that are converted to digital values. The digital values representing the optical test signal and the optical calibration signal are processed by a controller, such as a digital signal processor, and an calibration error value is calculated based on the second order or greater spectral lines of the optical calibration signal. The calibration error value is applied to the optical signal under test to accurately calibrate the test signal. The optical test signal is further processed and displayed on a display device.

The method of concurrently detecting an optical calibration signal and a optical signal under test in an optical spectrum analyzer having an optical system with a defined first order spectral range and comprising collimating optics, an optical signal calibration source generating an optical calibration signal, an optical signal under test input, an optical calibration signal input, an optical tuning element and first and second optical detectors, includes the step of concurrently launching the optical calibration signal and an optical signal under test into the optical system wherein the optical calibration signal has second order or greater spectral lines that fall within the range of the optical system. The method also includes the step of concurrently detecting the optical calibration signal and the optical signal under test using the first optical detector that is responsive to the optical signal under test and less responsive to the second order or greater spectral lines of the optical calibration signal and the second optical detector that is responsive to the second order or greater spectral lines of the optical calibration signal and less responsive to the optical signal under test. A further step in concurrently detecting an optical test signal and an optical calibration signal includes tuning the optical system over the first order spectral range to separate spectral components of the optical calibration signal and the optical signal under test. The method includes the additional step of concurrently converting the optical calibration signal and the optical signal under test to electrical signals.

The objects, advantages and novel features of the present invention are apparent from the following detailed description when read in conjunction with the appended claims and attached drawings.

DETAILED DESCRIPTION OF THE PREFERRED EMBODIMENT

Figure 1:
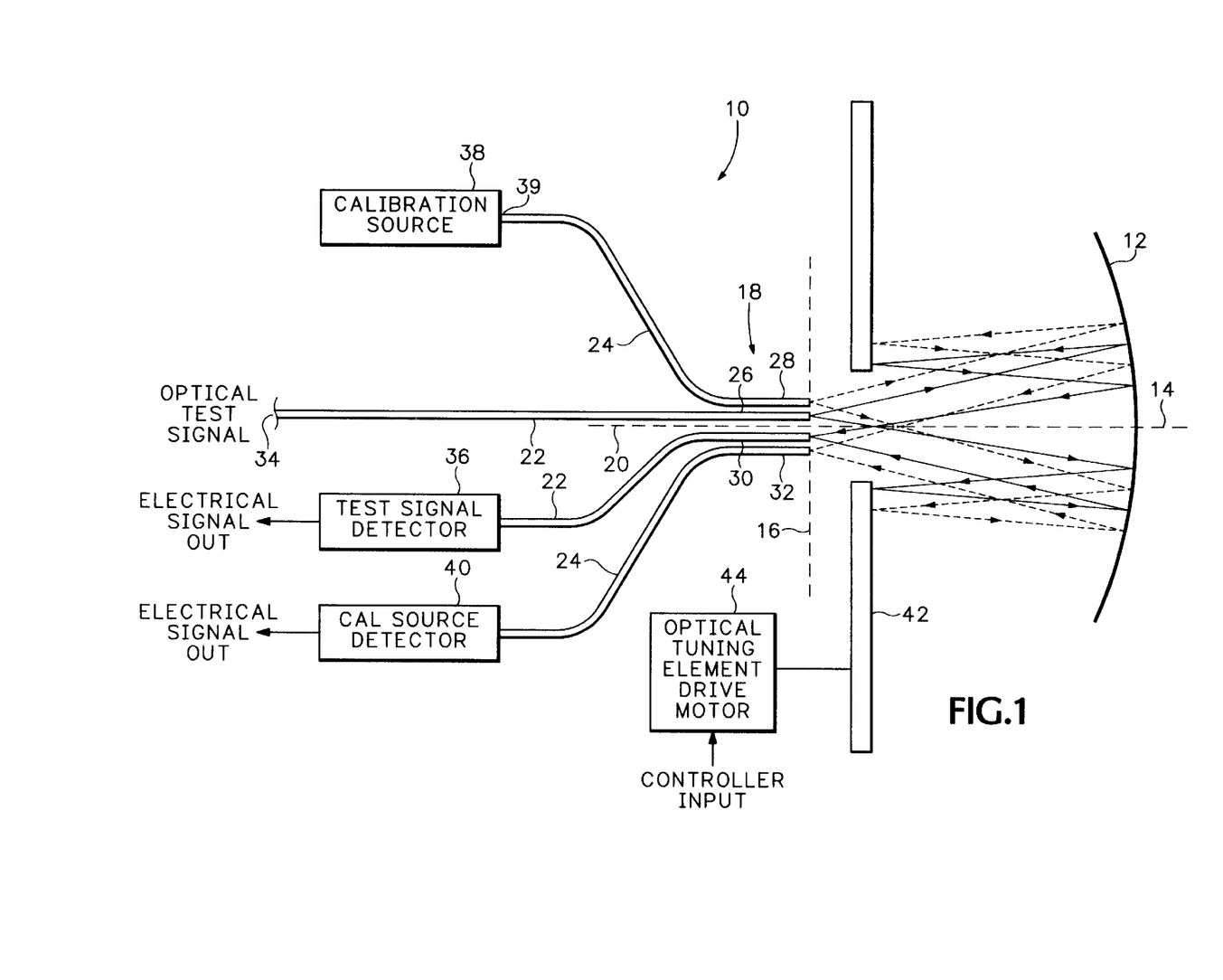
FIG. 1 is a representative illustration of the optical system according to the present invention.

Referring to FIG. 1, there is shown a representative illustration of an optical system 10 usable in an optical spectrum analyzer for concurrent detection of an calibration signal and a optical signal under test. The optical system 10 has a collimating optic 12, such as a parabolic mirror, spherical mirror, or the like having an optical axis 14 and a focal plane 16. Positioned in the focal plane 16 of the collimating optic 12 is a fiber array 18 having a central axis 20 colinear with the optical axis 14 of the collimating optic 12. The fiber array 18 has first and second pairs of optical fibers 22, 24 with each optical fiber pair having an input optical fiber 26, 28 and an output optical fiber 30, 32. The input and output optical fibers of each fiber pair 22, 24 are symmetrically positioned on either side of the central axis 20 of the fiber array 18. The input optical fiber 26 of the first pair of fibers 22 is coupled to receive the optical signal under test 34. The output optical fiber 30 of the pair is coupled to test signal detector 36, such as an InGaAs PIN photodiode or an InGaAs avalanche photodiode. The input optical fiber 28 of the second pair of fibers 24 is connected to an optical calibration source 38 that produces a spectral output in response to shifts in emission or absorption energy levels in atomic or molecular species. Examples of such optical sources are gas discharge lamps, such as argon and mercury-argon discharge lamps, and acetylene absorption cell illuminated by a broadband light source, such as a LED. The output optic fiber 32 of the pair is coupled to a calibration source detector 40, such as a silicon photodiode. Disposed between the fiber array 18 and the collimating optic 12 is a optical tuning element 42, such as diffraction grating that primarily determines a first order spectral range for the optical system 10. An optical tuning element drive motor 44 is connected to the optical tuning element 42 to tune the optical system 10 through the spectral range.

The optical system 10 of FIG. 1 concurrently detects both the optical calibration signal 39 from the optical calibration source 38 and the optical signal under test 34. The optical calibration source 38 generates an optical output 39 having second order and/or greater spectral lines that fall within the first order spectral range of the optical system 10. For example, in the preferred embodiment of the present invention the first order spectral range of the optical system 10 covers a range from 1450 nm to 1650 nm. In the preferred embodiment, the optical calibration source 38 is a mercury-argon discharge lamp. The optical calibration source 38 produces an optical output 39 having at least a first order spectral range that is one-half or less than the first order spectral range of the optical system 10. In the preferred embodiment, the spectral range of the optical calibration source 38 covers a spectral range from 725 nm to 825 nm.

It should be noted that the spectral range of the optical calibration source may also generate spectral lines at one-third, one-fourth and so on of the first order spectral range of the optical system 10. That is the spectral range of the optical calibration source may be 483.33 nm to 550 nm, 362.5 nm to 412.5 nm and so on. It should also be noted that the optical calibration source 38 can produces an optical output having multiple orders present at the same time. It should further be noted that first order spectral range of the optical system 10 may be other that the range given for the preferred embodiment and that the spectral range of the optical calibration source 38 may be other than the preferred embodiment range so long as the spectral range of the optical calibration source 38 is one-half or less than the optical system spectral range.

The optical system 10, in the preferred embodiment is configured in a Littrow mount. The fiber array 18 is positioned in the optical system 10 such that the central axis 20 of the fiber array 18 is colinear with the optical axis 14 of the collimating optic 12 and lies in the focal plane 16 of the collimating optic 12. In the preferred embodiment, the fiber array 18 is positioned in a V-groove block having central axis and approximately V-shaped channels formed therein that are parallel to the central axis 20 of the block. The V shaped channels are equidistant on either side of the central axis 20 of the V-groove block. The input and output optical fibers of each optical fiber pair 22, 24 are symmetrically positioned on either side of the fiber array central axis 20 and are therefore symmetrically positioned on either side of the optical axis 14 of the collimating optics 12. Because of the imaging characteristics of the collimating optics 12, light emitted from the input fibers 26, 28 on one side of the optical axis 14 become focused on the corresponding output fibers 30, 32 on opposite side of the optical axis 14. In the preferred embodiment, the first pair of optical fibers 22 closest to the optical axis 14 are used for measurements and the outside pair of optical fibers 24 are used calibration. The assignment of optical fiber pairs for measurement and calibration is arbitrary and the assignment of the optical fiber pairs 22, 24 may be reversed without departing from the scope of the invention.

The configuration and positioning of the fiber array 18 provides two optical paths through the optical system 10 that are spatially separate from each other but sufficiently close physically to experience the same perturbations, such as caused by temperature, shock, wear, mechanical drive deviation and the like. This means that optical signals input into one path does not physically couple into the other path. In reality, there is always unaccounted scattering that couples a small but finite amount of light between the two paths. To further isolate the optical paths, the paths involve spectral filtering in the respective optical detectors 36 and 40, which will be described in greater detail below. The result is high isolation between the two optical paths. And because the optical paths have the same wavelength dependency, it is possible to measure a spectrally known source on one of the paths and use that information to calibrate the other path, which is used to measure the optical test signal 34. If the signal-to-noise ratio in the known spectral source 38 is sufficiently high, the resulting optical spectrum analyzer has real-time calibration, where every test involves the acquisition of a known waveform that is used to calibrate the test waveform. The entire process is transparent to an optical spectrum analyzer user. From the operator's perspective, the optical spectrum analyzer remains in optimum calibration at all times, without the need for any calibration maintenance by the operator.

The solid lines emanating from the optical test fiber 26 represent the ray path of the optical test signal 34. The optical test signal 34 reflects off of the collimating optic 12 and impinges on the tuning diffraction grating 42. The diffracted spectral components from the diffraction grating 42 reflect off of the collimating optic 12 and the tuned spectral line or component is focused on the optical test signal detector fiber 30 symmetrically positioned on the opposite side of the collimating optic optical axis 14. This represents the first optical path through the optical system 10. The dashed lines emanating from the optical calibration source optical fiber 28 represents the ray path of the optical calibration signal 39. Like the test signal path, the optical calibration signal 39 reflects off of the collimating optic 12, diffracts off the tuning diffraction grating 42, and reflects off of the collimating optic 12 and is focused on the optical calibration source detector optical fiber 32 that is symmetrically positioned on the opposite side of the collimating optic optical axis 14. This represents the second optical path through the optical system 10. Since the wavelength scanning takes place in the direction perpendicular to the plane of FIG. 1, both optical paths experience the same wavelength errors, and both are corrected using the same wavelength calibration. Since the paths are physically separated, the optical calibration source 38 can be turned on when the unknown spectra is measured, and used to calibrate it.

The tuned spectral component of the optical test signal 34 is coupled through the optical test signal detector fiber 30 to the optical test signal detector 36. In the preferred embodiment, the optical test signal detector 36 is a InGaAs PIN or avalanche photodiode that is responsive to the first order spectral components of the optical test signal 34. The tuned spectral component of the optical calibration signal 39 is coupled through the optical calibration source fiber 32 to the optical calibration source detector 40. In the preferred embodiment, the optical calibration source detector 40 is a silicon photodetector that is responsive to the second order or greater spectral lines of the optical calibration source 38. Silicon detectors have better noise characteristics than InGaAs detectors. Furthermore, the silicon detector is less responsive to light in the range of 1450 nm to 1650 nm, so scattered light from the primary optical signal 34 will not interfere with the calibration detector 40. Additionally, the InGaAs detector is less responsive to the light in the range of 725 nm to 825 nm, so scattering from the optical calibration source 38 is less likely to interfere with the primary optical signal 34. It should be noted that the response characteristics of the test signal detector 36 and calibration detector 40 need not be limited to the respective spectral ranges given for the preferred embodiment. Other types of optical detectors may be used that are responsive over other spectral ranges so long as the test signal detector is responsive to the first order spectral components within the optical system spectral range and the calibration source detector is responsive to the second order or greater spectral components that fall within the spectral range of the optical system. The optical test signal detector 36 and the optical calibration source detector 40 concurrently convert the respective spectral component of the optical signal under test 34 and the calibration line of the optical calibration signal 39 to electrical signals that are amplified, digitized, stored and processed to provide an output display.

Figure 2:
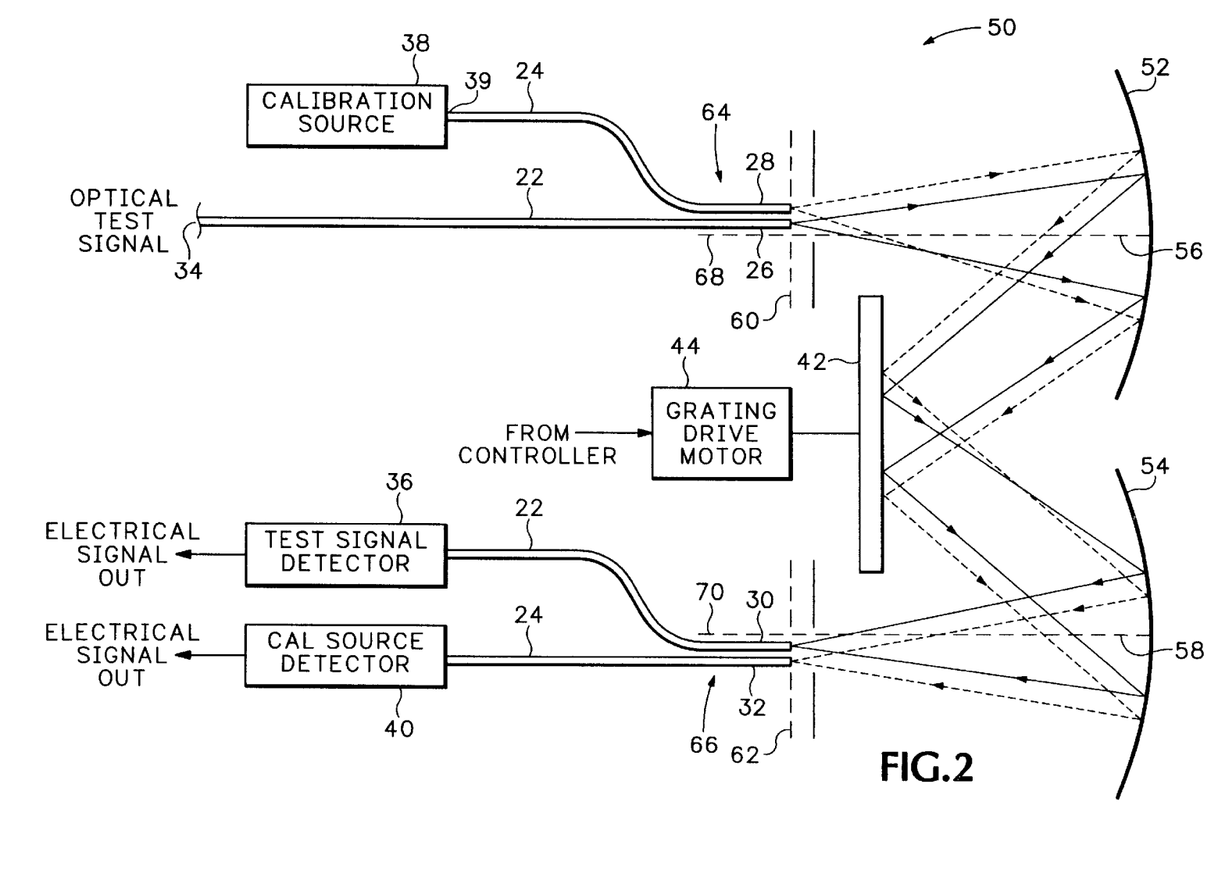
FIG. 2 is a representative illustration of an alternative optical system according to the present invention.

FIG. 2 shows a representative illustration of an alternative optical system 50 usable in an optical spectrum analyzer for concurrent detection of an optical calibration signal 39 and a optical signal under test 34. Like elements from FIG. 1 are labeled the same. The alternative optical system has first and second collimating optics 52, 54, such as a parabolic mirror, spherical mirror, or the like with each collimating optic 52, 54 having an optical axis 56, 58 and a focal plane 60, 62. Positioned in the respective focal planes 60, 62 of each of the collimating optics 52, 54 are fiber arrays 64, 66 having a central axis 68, 70. The fiber arrays 64, 66 have first and second pairs of optical fibers 22, 24 with each optical fiber pair having an input optical fiber 26, 28 and an output optical fiber 30, 32. One of the fiber arrays 64 includes the input optical fibers 26, 28 of the optical fiber pairs 22, 24 and the other fiber array 66 has the output optical fibers 30, 32 of the optical fiber pairs 22, 24. The input and output optical fibers of each fiber pair are positioned in parallel with the respective central axes 68, 70 of the fiber arrays 64, 66. The input optical fiber 26 of the first pair of fibers 22 is coupled to receive the optical signal under test 34. The output optical fiber of the pair is coupled to an optical test signal detector 36, such as an InGaAs PIN photodiode or an InGaAs avalanche photodiode. The input optical fiber 28 of the second pair of fibers 24 is connected to an optical calibration source 38 that produces a spectral output 39 in response to shifts in energy levels in atomic or molecular species. As previously described, the optical sources 38 may be a gas discharge lamps, such as argon and mercury-argon discharge lamps, or an acetylene absorption lamp illuminated by a broadband light source, such as a LED. The output optic fiber 32 of the pair 24 is coupled to a optical calibration source detector 40, such as a silicon photodiode. The collimating optics 52, 54 may be configured such that both input and output optical fibers 30, 32 of the fiber pairs 22, 24 are positioned on the same sides of the respective optical axes 56, 58 of the collimating optics 52, 54. Further, the collimating optics 52, 54 may have different focal lengths and may be oriented in different spacial planes requiring optical paths having compound optical angles. Laterally disposed between the fiber arrays 64, 66 and the collimating optics 52, 54 is a optical tuning element 42, such as diffraction grating that primarily determines a first order spectral range for the optical system 50. The tuning diffraction grating 42 need not be positioned within the focal lengths of the collimating optics 52, 54. An optical tuning element drive motor 44 is connected to the optical tuning element 42 to tune the optical system 50 through the spectral range.

The operation of the optical system 50 will be described using the same spectral ranges as previously described for FIG. 1. The optical test signal 34 may be characterized as a broadband optical signal having first order spectral components that fall within a spectral range from 1450 nm to 1650 nm. The optical calibration source 38 produces an optical output 39 that has second order and/or greater spectral lines that fall within the range of the optical system 50. As was previously described, the optical test signal 34 and the optical calibration signal 39 follow separate optical paths through the optical system 50. The solid lines emanating from the optical test signal fiber 26 represent the ray path of the optical test signal 34 through the optical system 50 and the dashed lines emanating from the optical calibration source fiber 28 represent the ray path of the optical calibration signal 39 through the optical system 50. The optical test signal 34 and the optical calibration signal 39 are reflected off of the first collimating optic 52 and onto the tuning diffraction grating 42. The tuned spectral components of the optical signals 34, 39 are diffracted from the tuning diffraction grating 42 and onto the second collimating optic 54. The second collimating optic 54 reflects the tuned optics signals 34, 39 and focuses the tuned spectral component of the optical test signal 34 onto the optical test signal output fiber 30 and focuses the tuned spectral component of the optical calibration signal 39 onto the optical calibration signal output fiber 32.

The tuned spectral component of the optical test signal 34 are coupled through the optical test signal output fiber 30 to the optical test signal detector 36. The optical test signal detector 36 is an InGaAs PIN or avalanche photodiode that is response to the first order spectral components of the optical test signal 34 and less responsive to the second order or greater spectral lines of the optical calibration signal 39. The tuned spectral component of the optical calibration signal 39 is coupled through the optical calibration signal output fiber 32 to the calibration source detector 40. The optical calibration source detector 40 is a silicon photodetector that is response to the second order or greater spectral lines of the optical calibration source 38 and less responsive to the first order spectral components of the optical test signal 34. The optical test signal detector 36 and the optical calibration source detector 40 concurrently detect the respective optical test signal 34 and the optical calibration signal 39 and convert the respective optical signal 34 and 39 to electrical signals.

Figure 3:
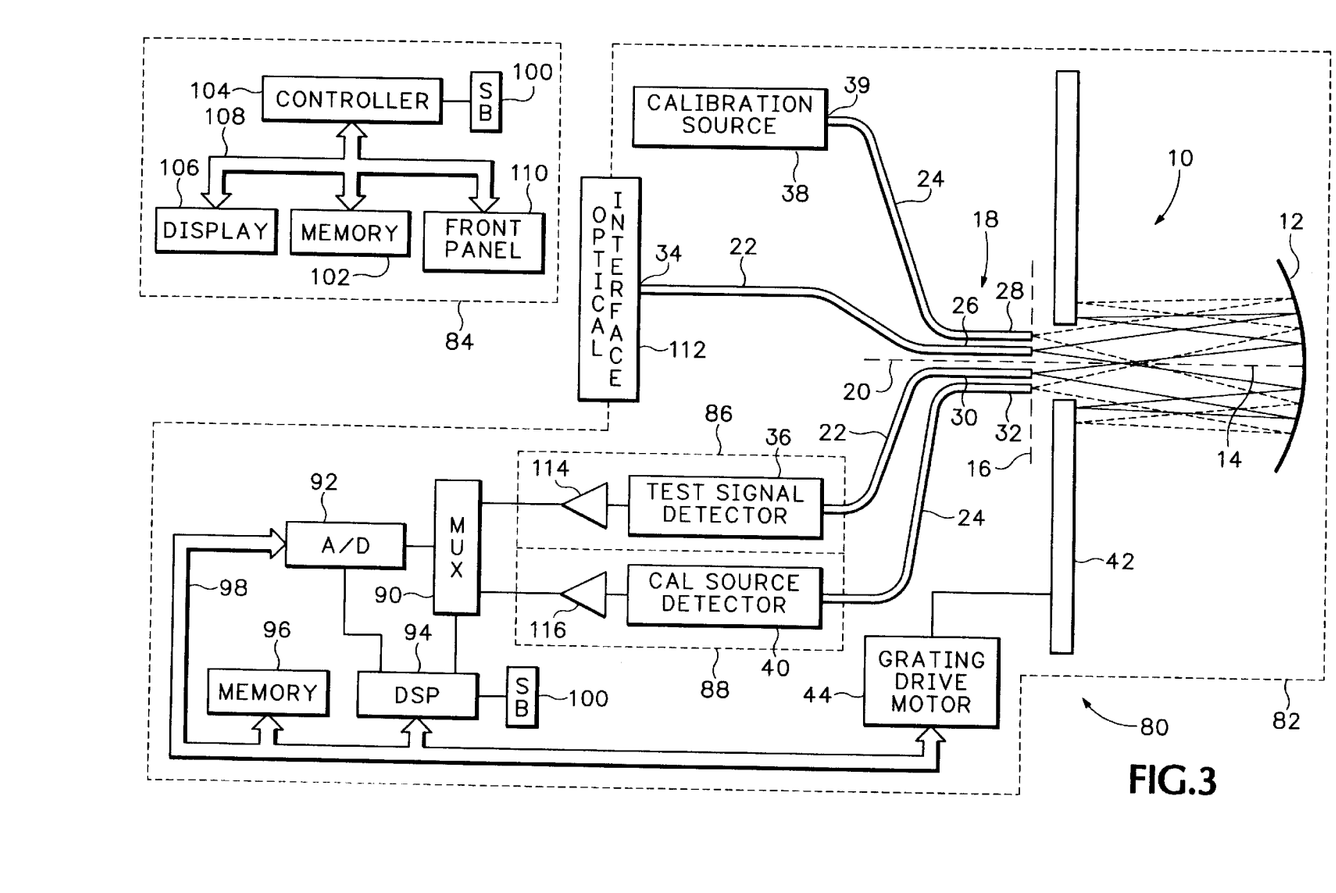
FIG. 3 is a representative block diagram of an optical spectrum analyzer using the optical system according to the present invention.

Referring to FIG. 3, there is shown a representative block diagram of an optical spectrum analyzer 80 incorporating the optical system 10 for concurrently detecting an optical calibration signal 39 and a optical signal under test 34. Like elements in FIG. 3 that are shown in the previous figures are labeled the same. The preferred embodiment of the optical spectrum analyzer 80 includes an optical spectrum analysis module 82 and a base unit 84. The optical spectrum analysis module 82 includes the optical system 10 for separating the spectral components of the optical signal under test 34 and the optical calibration signal 39. The optical system includes a parabolic mirror 12 acting as a collimating optic having an optical axis 14 and a focal plane 16. A fiber array 18 is positioned in the focal plane 16 of the parabolic mirror 12 and has a central axis 20 that is colinear with optical axis 14 of the mirror 12. The fiber array 18 has first and second pairs 22, 24 of input 26, 28 and output 30, 32 fibers with the input and output fibers of each pair being symmetrically positioned on either side of the fiber array central axis 20. The input optical fiber 26 of one pair of fibers 22 is coupled to receive an optical signal under test 34 and the other input fiber 28 is coupled to an optical calibration source 38. An optical tuning element 42 in the form of a diffraction grating tunes the optical system 10 over a first order spectral range. Optical receivers 86, 88 receive the respective optical test signal 34 and the optical calibration signal 39 and convert the optical signals into electrical signals. The respective electrical signals are multiplexed by a multiplexer 90 and coupled to an analog-to-digital (A/D) converter 92. The A/D converter 92 converts the electrical signals into digital values which are processed by a digital signal processor (DSP) 94 and stored in memory 96. Memory 96 includes both RAM and ROM memory with the RAM memory storing volatile data, such as the digital values representative of the spectral components of the optical test signal 34 and the optical calibration signal 39. The DSP 94 executes programmed instructions stored in the ROM memory 96 for acquiring, processing and storing digital values. A data and control bus 98 couples the memory 96 to the digital signal processor 94, as well as the A/D converter 92 and a diffraction grating drive motor 44. The diffraction grating drive motor 44 varies position of the diffraction grating 42 to tune the optical system 10 through the spectral range of the optical system 10. The DSP 94 further provides control signals to the multiplexer 90 and the A/D converter 92.

The stored data is coupled to the base unit 84 via a serial data line in optical spectrum analyzer system bus 100. The digital data from the optical spectrum analysis module 82 is stored in memory 102 and processed by a controller 104 for display on display device 106, such as a liquid crystal display, cathode ray tube or the like. In the preferred embodiment, the controller 104 is a XPC 821 microprocessor, manufactured and sold by Motorola, Inc. A data and control bus 108 couples the memory 102 to the controller 104 as well as the display device 106. The controller 104 is further coupled to front panel controls 110 that may include buttons, rotatable knobs and key pad for selecting specific measurement to be performed, measurement parameters, display windows and the like. In the preferred embodiment of the present invention, the control function of a tradition measurement instrument front panel are incorporated into a touch screen display that is part of the display device 106. The memory 102 contains RAM and ROM memory with the RAM memory storing the acquired and processed digital data from the optical spectral analysis module 82 and the ROM memory containing program instructions for controlling the operation of the optical spectrum analyzer 80. The optical spectrum analyzer 80 in the preferred embodiment of the invention is controlled under WINDOWS® CE operating system, manufactured and sold by Microsoft, Corp., Redmond, Wash.

In the preferred embodiment, the optical spectrum analyzer 80 has a first order spectral range from 1450 nm to 1650 nm that is primarily controlled by the tunable diffraction grating 42. The optical signal under test 34 is coupled into the optical spectrum analyzer 80 via an optical interface 112. The optical spectrum analyzer 80 measures the characteristics of the broadband optical test signal 34 in the 1450 nm to 1650 nm spectral range of the analyzer. The optical test signal 34 and the optical calibration signal 39 are coupled into the optical system 10 via the first and second input fibers 26,28 of the fiber array 18. The optical calibration source 38 generates an optical calibration signal 39 that has second order and/or greater spectral lines that fall within the spectral range of the optical system 10. The optical test signal 34 and the optical calibration signal 39 travel separate optical paths and are reflected off of the parabolic mirror 12 and onto the diffraction grating 42. The tuning diffraction grating 42 separates the first order spectral components of the optical test signal 34 and the second order or greater spectral lines of the optical calibration signal 39 and diffracts the tuned component and line back to the parabolic mirror 12 via separate optical paths. For example, the optical test signal 34 contains an number of optical signal with one being at 1500 nm. The diffraction grating 42 is tuned to 1500 nm via the diffraction grating drive motor 44 receiving tuning commands from the DSP 94 which separates the optical signal at 1500 nm from the other optical signals in the optical test signal 34. Concurrently, the diffraction grating 42 separates the second order 750 nm spectral line of the optical calibration signal 39. The tuned spectral component of the optical test signal 34 and the tuned spectral line of the optical calibration signal 39 are focused by the parabolic mirror 12 onto the respective optical test signal output fiber 30 and the optical calibration output fiber 32.

The tuned spectral component of the optical test signal 34 is coupled to the first optical receiver 86 having an optical detector 36 that is responsive to the first order spectral components of the optical test signal 34 and less responsive to the second order or greater spectral lines of the optical calibration signal 39. In the preferred embodiment of the optical spectrum analyzer 80, the optical detector 36 is a InGaAs avalanche photodiode. The tuned spectral line of the optical calibration signal 39 is coupled to a second optical receiver 88 having a optical detector 40 that is responsive to the second order or greater spectral lines of the optical calibration signal 39 and less responsive to the first order spectral components of the optical test signal 34. In the preferred embodiment of the optical spectrum analyzer 80, the optical detector 40 is a silicon photodiode. The optical detectors 36, 40 convert the respective optical test signal 34 and the optical calibration signal 39 into electrical signals. The electrical signals are coupled to respective amplifiers 114, 116 that amplify the respective electrical signal. The amplified electrical signals are coupled to the multiplexer 90 that multiplexes the signals under DSP 94 control and couples the multiplexed signals to the A/D converter 92. The A/D converter 92 digitizes the multiplexed signals under DSP 94 control and processes and stores the digitized values in RAM memory 96. In the example of an optical test signal 34 having an optical signal at 1500 nm and the second order calibration line being at 750 nm, the DSP 94 multiplies the digital values representing the 750 nm calibration line by two to produce digital values representing a calibration line at 1500 nm. Because the calibration line at 750 nm is known very precisely with a very small error, the uncertainty of the multiplied calibration line is also very small. The wavelength of the 1500 nm calibration line may also be measured at some other value by the optical spectrum analyzer 80, such as the appropriate third or forth order spectral line. The error between the measured calibration line and the actual calibration line is calculated by the DSP 94 and used to correct the 1550 nm optical test signal. The calibration error calculation and the correcting of the optical test signal are automatically performed by the DSP 94 and is transparent to the user of the optical spectrum analyzer.

The processed digital values in the RAM memory 96 are coupled to the controller 104 in the base unit 84 via the serial data line in system bus 100. The controller 104 further processes the digital values and formats the data for display on the display device 106.

The above optical spectrum analyzer has been described using the optical system of FIG. 1. The optical spectrum analyzer may equally be implemented using the optical system described in relation to FIG. 2. Further, the optical spectrum analysis module may be modified by removing the multiplexer and using separate analog-to digital converters for the outputs of the optical receivers. Additionally, the optical spectrum analysis module and the base unit may be combined into one package with a single controller performing the DSP function and the base unit controller function.

An optical system has been described that concurrently detects an optical test signal and an optical calibration signal. The optical system includes at least a first collimating optic having an optical axis and a focal plane. A fiber array is disposed in the focal plane of the collimating optic and has first and second fiber pairs. The fiber array has a central axis that is colinear with the optical axis of the collimating optic. The fiber pairs have input and output fibers with the input and output fibers of each pair being symmetrically positioned about the central axis. The optical system has a first order spectral range for measuring a broadband optical test signal and an optical calibration source that produces and optical calibration signal having second order spectral lines that fall within the spectral range of the optical system. The input optical fibers receive the optical test signal and the optical calibration signal and launch the respective optical signals toward the collimating optic. The optical test signal and the optical calibration signal take two separate optical paths through the optical system. The optical test signal and the optical calibration signal are reflected off of the collimating optic and directed toward a diffraction grating. The tuning diffraction grating separates the spectral components of the optical test signal and the spectral lines of the optical calibration signal and diffracts the tuned signals back to the collimating optic. The tuned spectral components of the optical test signal and the optical calibration lines are focused on the output optical fibers in the fiber array. The optical test signal fiber couples the tuned spectral component of the optical test signal to a test signal detector and the optical calibration line fiber couples the tuned optical calibration line to the calibration signal detector. The optical test signal detector is responsive to the first order optical components of the test signal and less responsive to the second order or greater calibrations lines of the optical calibration signal. The calibration signal detector is responsive to the second order or greater optical calibration lines and less responsive to the first order spectral components of the optical test signal. The optical detectors convert the respective optical test signal and the optical calibration signal to electrical signals. Such an optical system is usable in an optical spectrum analyzer for providing concurrent calibration of the instrument.

Thus, the optical system concurrently detecting an optical test signal and an optical calibration signal usable in an optical spectrum analyzer has been described. Whereas many alteration and modifications to the present invention will be comprehended by a person skilled in the art after having read the foregoing description, it is to be understood that the particular embodiments shown and described by way of illustration are in no way intended to be considered limiting. References to details of particular embodiments are not intended to limit the scope of the appended claims.

What is claimed is:

1. An optical system having a defined first order spectral range that concurrently detects an optical calibration signal and an optical signal under test comprising:

collimating optics having an optical axis and a focal plane receiving the optical calibration signal and the optical signal under test;

a fiber array having a center axis that is colinear with the optical axis of the collimating optics and first and second pairs of optical fibers disposed in the focal plane of the collimating optics with each pair of fibers having an input optical fiber and an output optical fiber, the input and output optical fibers of each pair being symmetrically positioned on either side of the center axis with the input fiber of the first pair of optical fibers coupled to receive the optical signal under test;

an optical source coupled to the input fiber of the second pair of optical fibers generating an optical calibration signal having second order or greater spectral lines that fall within the first order spectral range of the optical system;

an optical tuning element receiving the optical calibration signal and the optical signal under test from the collimating optics for tuning the optical system over the first order spectral range to separate spectral components of the optical signal under test and pass the second order or greater spectral lines of the optical calibration signal;

a first optical detector coupled to the output optical fiber of the first pair of optical fibers and responsive to the spectral components of the optical signal under test and less responsive to the second order or greater spectral lines of the optical calibration signal; and a second optical detector coupled to the output optical fiber of the second pair of optical fibers and responsive to the second order or greater spectral lines of the optical calibration signal and less responsive to the spectral components of the optical signal under test.

2. The optical system as recited in claim 1 wherein the collimating optics is a parabolic mirror.

3. The optical system as recited in claim 1 wherein the collimating optic is a spherical mirror.

4. The optical system as recited in claim 1 wherein the fiber array further comprises a V-groove block having approximately V-shaped channels formed therein that are parallel to and equidistant on either side of the central axis of the V-block.

5. The optical system as recited in claim 1 wherein the optical source is a optical signal generating device producing a spectral output in response to shifts in energy levels in atomic species.

6. The optical system as recited in claim 1 wherein the optical source is a optical signal generating device producing a spectral output in response to shifts in energy levels in molecular species.

7. The optical system as recited in claim 1 wherein the optical source is a mercury-argon discharge.

8. The optical system as recited in claim 1 wherein the optical tuning element is a diffraction grating.

9. The optical system as recited in claim 1 wherein the optical detector in the first optical receiver is a InGaAs PIN photodiode.

10. The optical system as recited in claim 1 wherein the optical detector in the first optical receiver is a InGaAs avalanche photodiode.

11. The optical system as recited in claim 1 wherein the optical detector in the second optical receiver is a silicon photodiode.

12. An optical system having a defined first order spectral range for concurrent detection of an optical calibration signal and a optical signal under test comprising:

first and second collimating optics with each collimating optic having an optical axis and a focal plane, the first collimating optic receiving the optical calibration signal and the optical signal under test;

first and second fiber arrays with each array having a center axis, the first fiber array holding input optical fibers of first and second pairs of optical fibers in parallel with the central axis and disposed in the focal plane of the first collimating optic, and the second fiber array holding output optical fibers of the pairs of optical fibers in parallel with the central axis and disposed in the focal plane of the second collimating optic with the input fiber of the first pair of optical fibers coupled to receive the optical signal under test;

an optical source coupled to the input fiber of the second pair of optical fibers generating an optical calibration signal having second order or greater spectral lines that fall within the spectral range of the optical system;

an optical tuning element receiving the optical calibration signal and the optical signal under test from the second collimating optic for tuning the optical system over the first order spectral range to separate spectral components of the optical signal under test and pass the second order or greater spectral lines of the optical calibration signal;

a first optical detector coupled to the output optical fiber of the first pair of optical fibers and responsive to the spectral components of the optical signal under test and less responsive to the second order or greater spectral lines of the optical calibration signal; and a second optical detector coupled to the output optical fiber of the second pair of optical fibers and responsive to the second order or greater spectral lines of the optical calibration signal and less responsive to the spectral components of the optical signal under test.

13. The optical system as recited in claim 1 wherein the first and second collimating optics are parabolic mirrors.

14. The optical system as recited in claim 1 wherein the first and second collimating optics are a spherical mirrors.

15. The optical system as recited in claim 12 wherein the first and second fiber arrays further comprises a V-groove block having approximately V-shaped channels formed therein that are parallel to the central axis of the V-block.

16. The optical system as recited in claim 12 wherein the optical source is a optical signal generating device producing a spectral output in response to shifts in energy levels in atomic species.

17. The optical system as recited in claim 12 wherein the optical source is a optical signal generating device producing a spectral output in response to shifts in energy levels in molecular species.

18. The optical system as recited in claim 12 wherein the optical source is a mercury-argon discharge.

19. The optical system as recited in claim 12 wherein the optical tuning element is a diffraction grating.

20. The optical system as recited in claim 12 wherein the optical detector in the first optical receiver is a InGaAs PIN photodiode.

21. The optical system as recited in claim 12 wherein the optical detector in the first optical receiver is a InGaAs avalanche photodiode.

22. The optical system as recited in claim 12 wherein the optical detector in the second optical receiver is a silicon photodiode.

23. An optical spectrum analyzer having a defined spectral range and an optical system for concurrently detecting an optical calibration signal and a broadband optical signal under test for measuring and displaying the spectral components of the optical signal under test comprising:

collimating optics having an optical axis and a focal plane receiving the optical calibration signal and the optical signal under test;

a fiber array having a center axis that is colinear with the optical axis of the collimating optics and first and second pairs of optical fibers disposed in the focal plane of the collimating optics with each pair of fibers having an input optical fiber and an output optical fiber, the input and output optical fibers of each pair being symmetrically positioned on either side of the center axis with the input fiber of the first pair of optical fibers coupled to receive the optical signal under test;

an optical source coupled to the input fiber of the second pair of optical fibers generating an optical calibration signal having second order or greater spectral lines that fall within the first order spectral range of the optical system;

an optical tuning element receiving the optical calibration signal and the optical signal under test from the collimating optics for tuning the optical system over the first order spectral range to separate spectral components of the optical signal under test and pass the second order or greater spectral lines of the optical calibration signal;

a first optical receiver having an optical detector coupled to the output optical fiber of the first pair of optical fibers and responsive to the spectral components of the optical signal under test and less responsive to the second order or greater spectral lines of the optical calibration signal for generating an electrical signal representative of the spectral components of the optical signal under test;

a second optical receiver having an optical detector coupled to the output optical fiber of the second pair of optical fibers and responsive to the second order or greater spectral lines of the optical calibration signal and less responsive to the spectral components of the optical signal under test for generating an electrical signal representative of the second order or greater spectral lines of the optical calibration signal;

means for converting the electrical signals from the optical receivers into digital values; and means for processing the digital values to generate calibration error values from the digital values representative of the optical calibration signal spectral lines and applying the error values to the digital values representative of the spectral components of the optical signal under test.

24. The optical spectrum analyzer as recited in claim 23 wherein the optical source generates second order or greater spectral lines in a range from 725 nm to 825 nm.

25. The optical spectrum analyzer as recited in claim 24 wherein the optical source is a mercury-argon discharge lamp.

26. The optical spectrum analyzer as recited in claim 23 wherein the optical detector in the first optical receiver is a InGaAs PIN photodiode.

27. The optical spectrum analyzer as recited in claim 23 wherein the optical detector in the first optical receiver is a InGaAs avalanche photodiode.

28. The optical spectrum analyzer as recited in claim 23 wherein the optical detector in the second optical receiver is a silicon photodiode.

29. The optical spectrum analyzer as recited in claim 23 wherein the optical tuning element is a diffraction grating.

30. The optical spectrum analyzer as recited in claim 28 further comprising a diffraction grating tuning motor that tunes the diffraction grating over a first order spectral range from 1450 nm to 1650 nm.

31. The optical spectrum analyzer as recited in claim 23 wherein the electrical signal converting means comprises:

a multiplexer coupled to receiver the electrical signals from the first and second optical receivers;

an analog-to digital converter alternately receiving the electrical signals from the first and second optical receivers.

32. The optical spectrum analyzer as recited in claim 23 wherein the processing means comprises a digital signal processor.

33. A method of concurrently detecting an optical calibration signal and a optical signal under test in an optical spectrum analyzer having an optical system with a defined first order spectral range and comprising collimating optics, an optical signal calibration source generating an optical calibration signal, an optical signal under test input, an optical calibration signal input, an optical tuning element and first and second optical detectors, the method comprising the steps of:

a) concurrently launching the optical calibration signal and an optical signal under test into the optical system wherein the optical calibration signal has second order or greater spectral lines that fall within the range of the optical system; and b) concurrently detecting the optical calibration signal and the optical signal under test using the first optical detector that is responsive to the optical signal under test and less responsive to the second order or greater spectral lines of the optical calibration signal and the second optical detector that is responsive to the second order or greater spectral lines of the optical calibration signal and less responsive to the optical signal under test.

34. The method of concurrently detecting an optical calibration signal and a optical signal under test in an optical spectrum analyzer as recited in claim 33 further comprising the step of tuning the optical system over the first order spectral range to separate spectral components of the optical calibration signal and the optical signal under test.

35. The method of concurrently detecting an optical calibration signal and a optical signal under test in an optical spectrum analyzer as recited in claim 33 wherein the concurrent detecting step further comprises the step of concurrently converting the optical calibration signal and the optical signal under test to electrical signals.

* * * * *